United States Patent [19]

Erhardt

[11] Patent Number: 4,846,694
[45] Date of Patent: Jul. 11, 1989

[54] COMPUTER CONTROLLED, OVERHEAD PROJECTOR DISPLAY

[75] Inventor: Heinrich S. Erhardt, Downington, Pa.

[73] Assignee: Image Storage/Retrieval Systems, Inc., West Trenton, N.J.

[21] Appl. No.: 208,923

[22] Filed: Jun. 20, 1988

[51] Int. Cl.⁴ .............................................. G03B 21/00
[52] U.S. Cl. ...................................... 434/365; 353/31; 353/42; 353/122; 353/DIG. 3; 340/707; 364/520
[58] Field of Search ..................... 434/365; 353/31, 42, 353/122, DIG. 3, DIG. 5; 340/707; 364/520

[56] References Cited

U.S. PATENT DOCUMENTS

| | | | |
|---|---|---|---|
| 3,775,005 | 11/1973 | Szabo | 353/42 |
| 3,844,650 | 10/1974 | Nicholson et al. | 353/DIG. 3 |
| 4,222,641 | 9/1980 | Stolou | 353/122 |
| 4,652,101 | 3/1987 | Grunwald | 353/DIG. 3 |
| 4,679,909 | 7/1987 | Hamada et al. | 340/707 |

Primary Examiner—Leo P. Picard
Attorney, Agent, or Firm—Barry R. Lipsitz

[57] ABSTRACT

Apparatus for demonstrating the use of a computer terminal comprises a projection module supported on a standard overhead projector. The projection module includes a frame which is adapted to rest on an illumination window of the overhead projector. A transmissive liquid crystal display is mounted in the frame parallel to the illumination window such that an image on said liquid crystal display is projected by the projector. A transparent touch screen is also mounted in the frame overlaying the liquid crystal display. By means of a stylus, a user touches the touch screen and thereby designates desired text and/or images for subsequent display. Coupled to the decoder is a computer which retrieves the desired text and/or images which are then transmitted to a display driver. The aforesaid apparatus is most suited to demonstrate a computer terminal which has a touch screen for selecting text and/or images for display.

15 Claims, 8 Drawing Sheets

COMPUTER CONTROLLED, OVERHEAD PROJECTOR DISPLAY

BACKGROUND OF THE INVENTION

The invention relates generally to computer controlled, overhead projector systems, and deals more particularly with such a system configured as a teaching aid or demonstrator; one application is to demonstrate a computer terminal having a touch screen control.

Co-pending patent application entitled, "SYSTEM FOR STORING AND RETRIEVING TEXT AND ASSOCIATED GRAPHICS", U.S. application Ser. No. 163,398, filed Mar. 2, 1988 by John Montagna, et al, discloses a computerized insurance estimator system, service manual, or other system which includes a computer terminal and a touch screen control. This patent application is hereby incorporated by reference as part of the present disclosure. Each of the systems in the co-pending patent application stores text, graphics, data and work sheets on a CD-ROM or other storage device for display on the terminal. The terminal preferably includes a liquid crystal display and a touch screen overlaying the display. By means of the touch screen, a user selects a sequence of text, graphics, data and work sheets for display to implement an insurance estimation function, to reference information from the computerized service manual, or to perform other functions.

Need has arisen for an effective tool to teach others how to use the systems described in the co-pending patent application and to teach a variety of other things with an input/output video aid. Oral instruction without a video aid is not satisfactory, nor is the use of large, hard copies of the various documents and menus displayed by the computer terminal.

A computer controlled, overhead projector with a transmissive liquid crystal display overlaying the projector was previously known. However, the input for this device is a keyboard, and the projector/display is strictly an output device. Therefore, the prior art computer controlled, overhead projector is not an effective tool for teaching or demonstrating the system described in the co-pending patent application and other systems which include a touch screen control.

Accordingly, a general object of the present invention is to provide an effective teaching aid or demonstrator for a computer terminal having a touch screen control or light pen control.

A more specific object of the present invention is to provide an effective teaching aid for the systems described in the aforesaid co-pending patent application and other such systems.

Another general object is to provide a general purpose teaching aid with video.

SUMMARY OF THE INVENTION

The invention resides in an apparatus for demonstrating the use of a computer terminal particularly one having a touch screen. The apparatus comprises a frame adapted for support on an illumination window of an overhead projector. A transmissive video display is mounted in the frame above the illumination window of the overhead projector such that an image on the display is projected by the projector. A touch screen is mounted in the frame and overlays the display. A decoder is provided to decode touch points on the touch screen, and a display driver is provided to display text and/or images based on the touch points.

According to one feature of the invention, a stylus is coupled to the decoding means for touching said touch screen and thereby designating touch points. The stylus can be deactivated such that points on the touch screen touched by the stylus do not activate the decoder. Consequently, the stylus is usable either as an input instrument or as a pointer in conjunction with the overhead projector.

DETAILED DESCRIPTION OF THE PREFERRED EMBODIMENT

Figure 1:
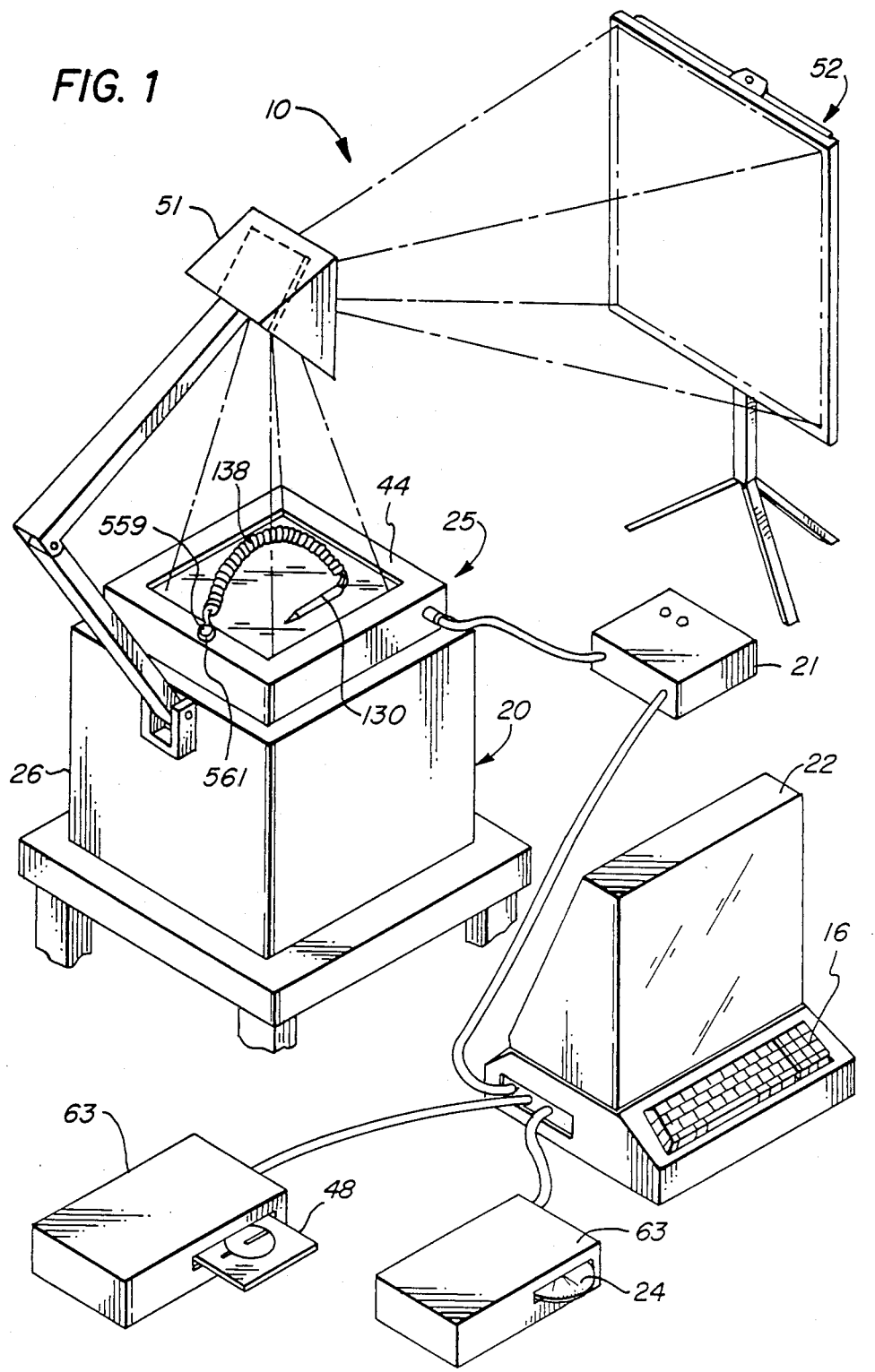
FIG. 1 is a perspective view of a computer controlled, overhead projector system according to the present invention.

Referring now to the Figures in detail wherein like reference numerals indicate like elements throughout the views, FIG. 1 illustrates a computer controlled overhead projector system generally designated 10 in accordance with the present invention. System 10 includes a computer terminal 22 and a reader or control 63 coupled to the computer for inputting software stored in floppy (or hard) disk 48, which software dictates the operation of the computer. Some start-up information is input to the computer by a keyboard 16. A CD-ROM reader 63 is also coupled to computer 22 and reads text, graphics, worksheets and other data from a CD-ROM 24 for display during the course of implementing an insurance estimation function, referencing a service manual, or implementing another function pursuant to the software read from the floppy (or hard) disk. For example, CD-ROM may store a multiplicity of documents which describe various procedures for repairing an automobile in the service manual function. The text, associated graphics and data forming the documents may be called up by a repair person as described in more detail below to guide the person through a repair procedure.

Figure 2:
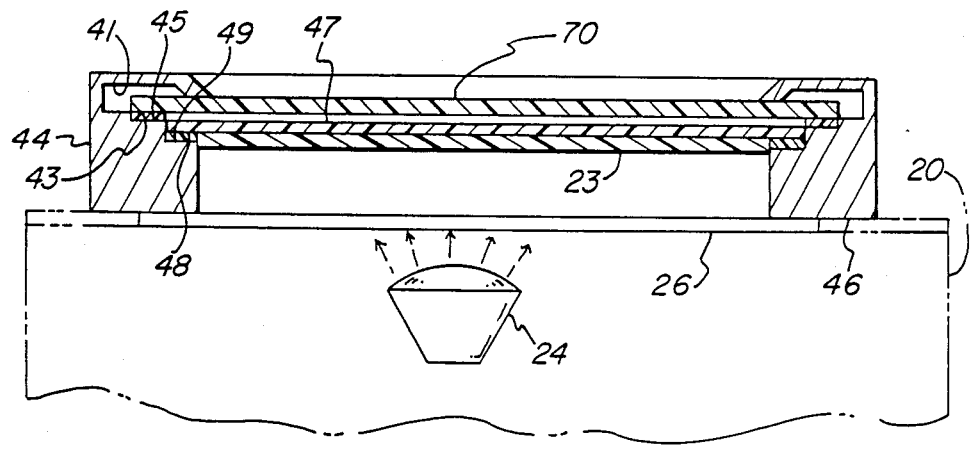
FIG. 2 is a view of an I/O projection module within the system of FIG. 1, in cross section in a plane perpendicular to the plane of a liquid crystal display and touch screen within the overhead projection module.

As further illustrated in FIG. 1, system 10 also includes a conventional, overhead projector 20, an I/O projection module 25 and a controller 21 for the module, which controller is coupled to computer 22. Projector 20 includes a conventional housing 26, a lamp and lens assembly 24 illustrated schematically in FIG. 2, which assembly projects light upwardly through an illumination window 26 in the housing. Module 25 rests on the illumination window and comprises a support frame 44, a transmissive (transparent or semi-transparent) liquid crystal display 23, and a touch screen 70. Touch screen 70 is received in a recess 41 within frame 44, and is bonded by resilient adhesive 43 on a ledge 45. In the illustrated embodiment, the ledge is parallel to a bottom surface 46 of the module so that the touch screen is parallel to illumination window 26 of the projector. Liquid crystal display 23 comprises two layers bonded to each other. An upper layer 47 is larger than the lower layer, is also received in recess 41, and is bonded by resilient adhesive 48 on a ledge 49 below ledge 45. In the illustrated embodiment, ledge 49 is parallel to bottom surface 46 so that LCD 23 is parallel to illumination window 26. There is also a gap between touchscreen 70 and LCD 23.

By way of example, Sharp Models LM64035J or LM64148E are suitable for the LCD. There is no back lighting or reflector provided beneath the display; rather, the light of projector 20 projects upwardly through the liquid crystal display. Projector 20 also includes a mirror and lens assembly 51 to reflect the light transmitted through LCD 23 to a shade-type projector screen 52. By way of example, the touch screen is a resistive touch screen manufactured by Microtouch Systems, Inc. of Massachusetts, U.S.A., and is capable of resolving 640×400 display pixels. Alternately, the touch screen may be a capacitive, infrared, surface acoustic wave sensing or other type.

Figure 4:
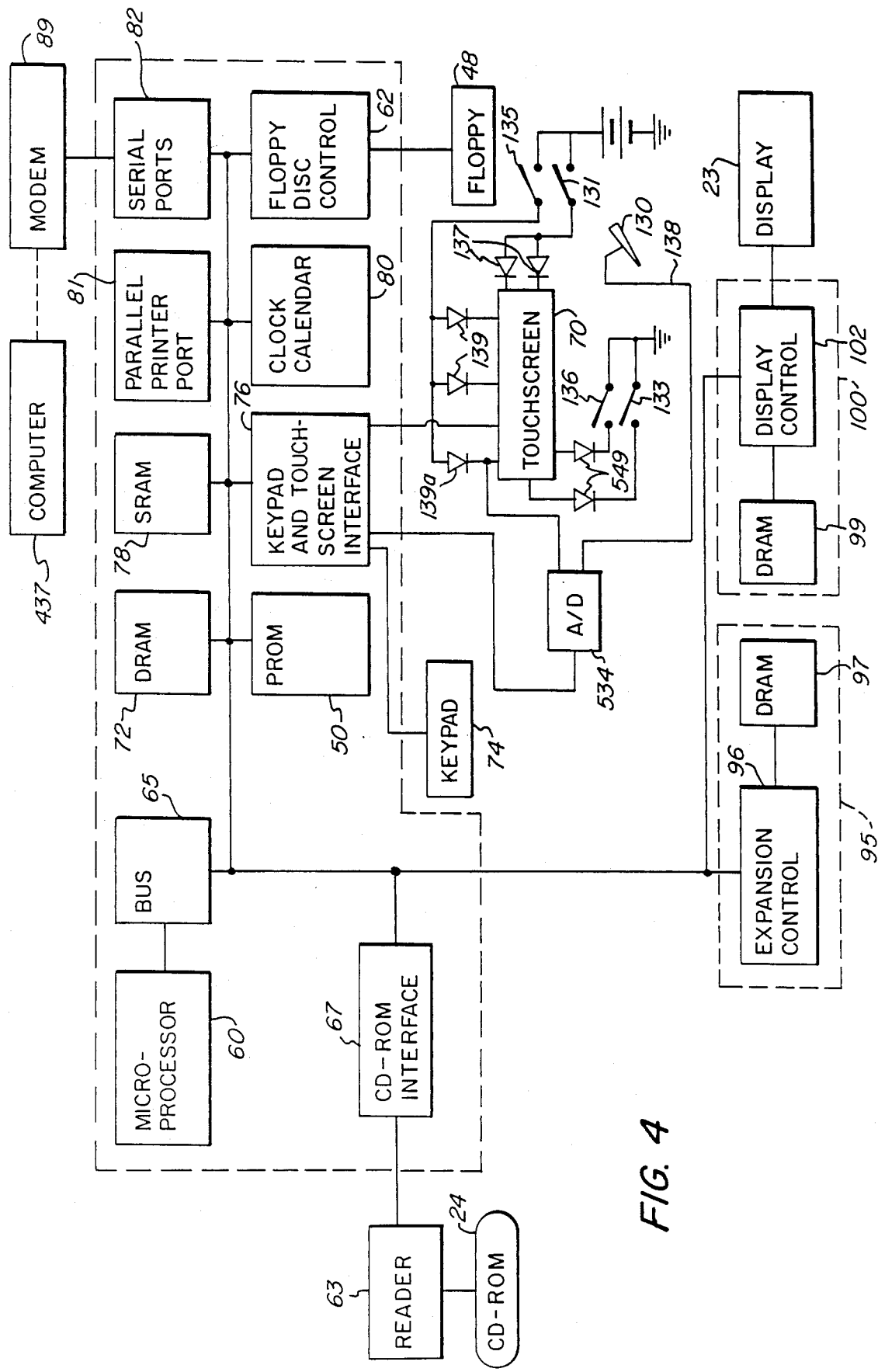
FIG. 4 is a block diagram of electronic hardware, firmware and other components of the overhead projector system of FIG. 1.

The location of the area touched by a wand or stylus 130 is decoded by a keypad and touch screen interface 76 (FIG. 4). Interface can be located either in module 25 or controller 21 and operates as follows. A D.C. voltage is applied to one side edge of the touch screen via an electronic switch 131 and diodes 137, and the opposite side edge is grounded via another electronic switch 133. Both switches are controlled by interface 76. The stylus is connected to the input of an A/D converter 534. The touch screen is resistive so that the voltage at the point of touch corresponds to the location between the aforesaid side edges. Next, the voltage is applied to one of the other perpendicular side edges via switch 135 and diodes 139, and the opposite side edge is grounded via switch 136 to determine the location between these two side edges. A multiplicity of diodes represented schematically by the numeral 549 are arranged along the two grounded side edges of the touch screen to isolate the two grounded edges from each other and thereby permit independent X-Y measurements of the touch points as is well known in the art. Firmware controls this decoding operation.

The heat generated by the projector affects the operation of touch screen 70 because the voltage drop across each of diodes 137, 139 and 549 increases with increased temperature. However, A/D converter 534 also senses the voltage at the cathode of diodes 139a, and the voltages across all the diodes are approximately the same. After reading the output of A/D converter 534, interface 76 generates a corresponding temperature compensation factor.

Figure 3:
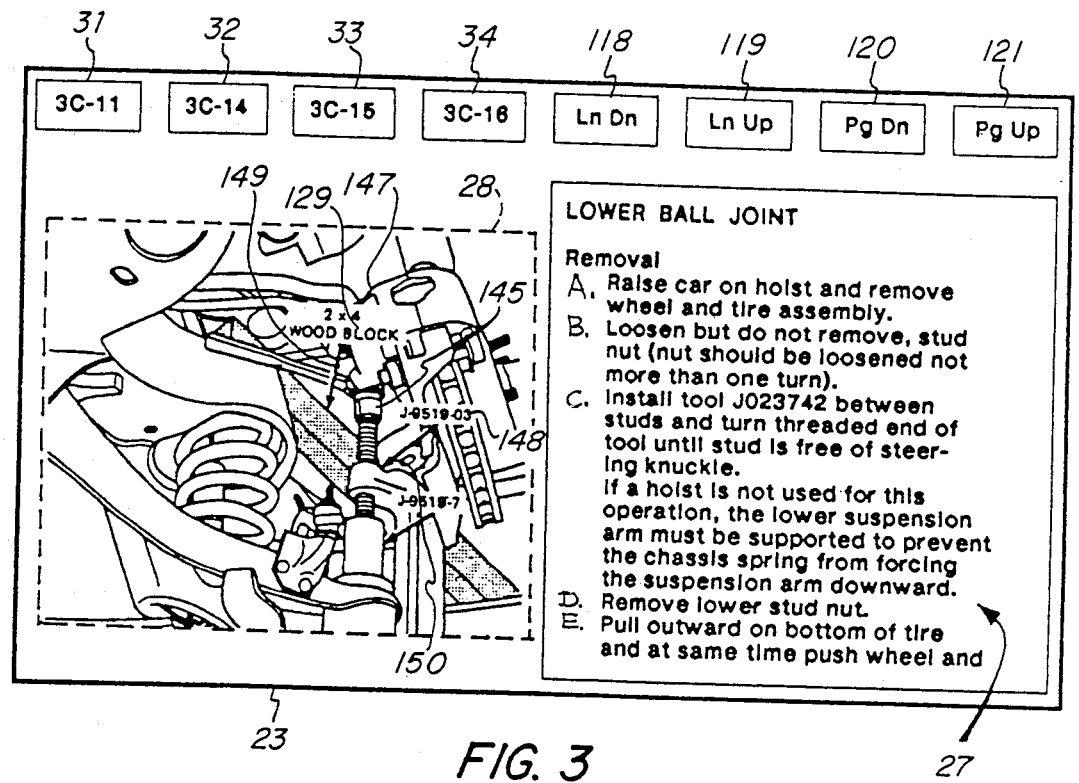
FIG. 3 is a plan view of an image produced by the system of FIG. 1 displaying a portion of document text and associated graphics for a service manual application.

FIG. 3 illustrates a page of text and associated graphics of a document included in the service manual function, displayed by the LCD and projected onto projector screen 52. The page of text describes a portion of a procedure for removing a lower ball joint of an automobile, and the associated graphics illustrate the lower ball joint and adjacent parts of an automobile. The user can make selections and commands relating to text, worksheets, graphics and data displayed on liquid crystal display 23 by touching screen 70. For example, if a user touches a point on graphic image 28, computer 22 is programmed as described in the aforesaid co-pending patent application to enlarge and center the image about the point of touch. Also, as illustrated in FIG. 3, at the top of the display is a group of touch pads 31–34 which, when touched by the stylus 130, direct the computer to display a different image or page of the document. Touch pads 118–121 direct the computer to scroll the text up or down either line by line or page by page.

It should be noted that as a teacher makes each touch on the touch screen with stylus 130, the projector displays not only the text, graphics and touch pads illustrated in FIG. 3, but also the stylus 130, so that the students can see precisely how to operate a corresponding, non-demonstrator system; the stylus not only serves to direct the student's attention to regions of each image but also serves to make commands to computer 22 to enlarge/center graphic images, select different documents for viewing, and/or scroll the text. A cable 138 is attached to a plug 539, leads to stylus 130 and couples the stylus to A/D converter 534. The plug is releasably attached in a socket 561 to frame 44 of module 25 to activate or deactivate the stylus. After deactivating the stylus, the teacher can use the stylus as a pointer without transmitting commands to computer 22 which would change the graphic image. Alternately, a switch can be provided in series with the stylus to deactivate it.

FIG. 4 illustrates the basic components of computer terminal 22 as described in the aforesaid copending patent application. Terminal 22 includes a master microprocessor 60 which implements the main software routine stored on floppy disk 48. By way of example, microprocessor 60 is Model 80C88 manufactured by Harris Corporation. Microprocessor 60 communicates with the remainder of the system via a bus 65 which, by way of example, is Model FE2010 manufactured by Faraday Electronics and/or Western Digital Company. After microprocessor 60 reads the software stored on disk 48, the software may be downloaded into dynamic random access memory (DRAM) 72 which by way of example has a 640K byte capacity.

A membrane keypad 74 may also be provided to allow a user to initiate a program by suitable entry. The entry is read by microprocessor 60 with the aid of keyboard and touch screen interface 76 via bus 65 which interface encodes the keyboard and touch screen entries. Software previously loaded into PROM 50 from the floppy disk 48 controls the decoding of the touch screen. The decoded information is transmitted to microprocessor 60 via bus 65.

A static random access memory (SRAM) 78 stores calibration constants representing the alignment of the touch screen relative to the display screen and other information described below.

An electronic clock and calendar module 80 is also provided to assist system 10 in generating reports. A parallel data port 81 provides communication with a printer, and serial data ports 82 provide communication with a central computer 437 via a modem 89.

Figure 5:
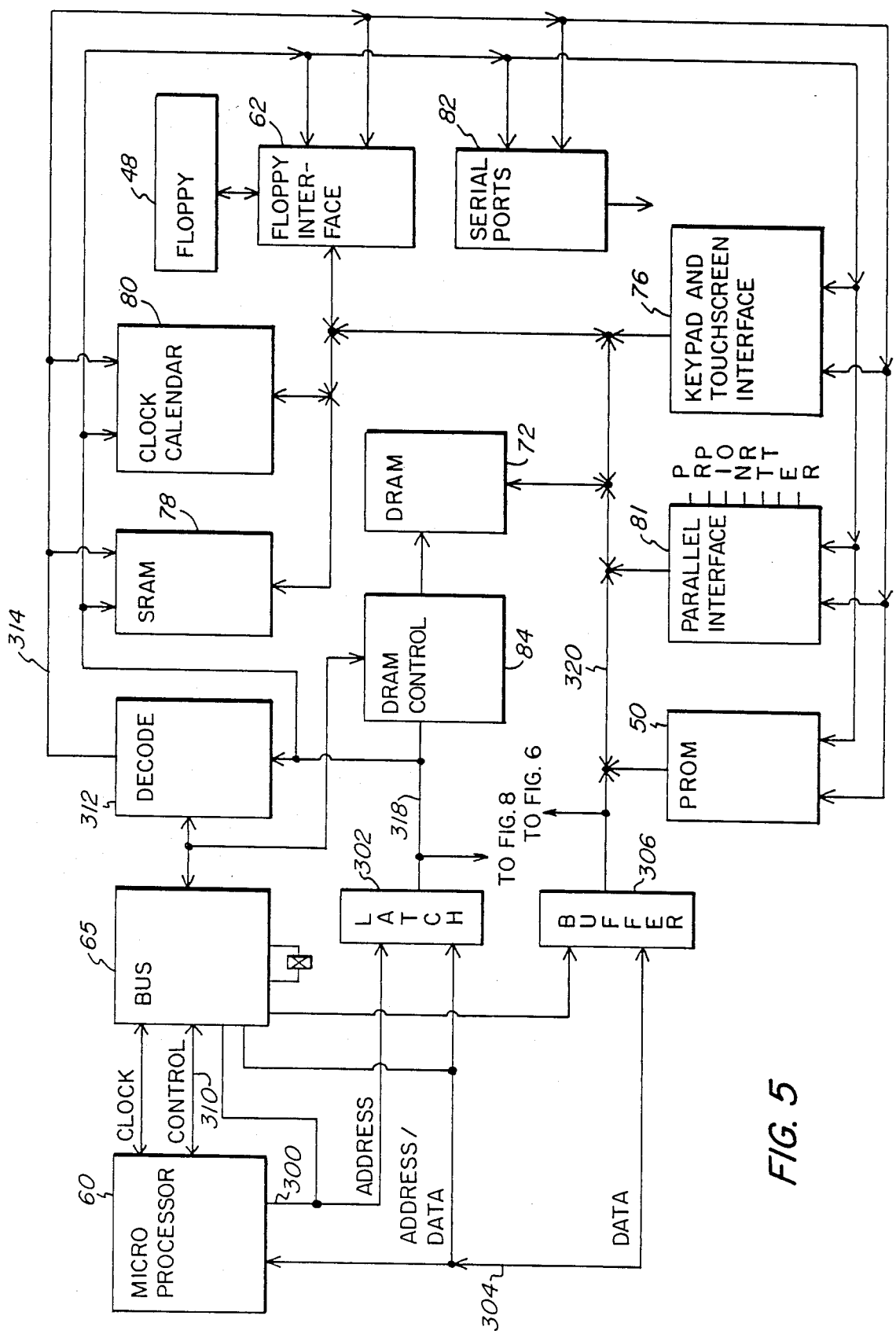
FIG. 5 is a schematic block diagram of some of the components of FIG. 4 and shows the interconnections between the components in more detail as well as additional related components.

Communication channels between the foregoing elements of system 10 are illustrated in more detail in FIG. 5, along with additional related components. To transmit data, microprocessor 60 transmits via lines 300 an address of the destination component to bus controller 65 and latch 302. Microprocessor 60 also transmits the data via lines 304 to buffer 306, and a write command via line 310 to bus 65. An address decoder 312 transmits corresponding enable signals to the destination component via lines 314. Then the destination component reads the address at which the data should be stored from latch 302 via bus or lines 318 and then reads the data from buffer 306 via bus or lines 320.

To read data, microprocessor 60 transmits the address of the source component to bus controller 65 and latch 302, and a read command on line 310 to bus controller 65. In response, address decoder 312 transmits corresponding enable signals to the source component via lines 314. Next, the source component reads the address at which the data should be read from latch 302 via lines 318, and then transmits the data into buffer 306 via lines 320. Microprocessor 60 reads the data from buffer 306.

FIG. 4 also illustrates an image decompression board 95 comprising a dedicated processor 96 and an associated DRAM 97 providing work space for the decompression process. By way of example, board 95 is a Model TMS-34010 manufactured by Texas Instruments of U.S.A. Decompression board 95 decompresses the graphic image data stored on CD-ROM 24, and transmits the decompressed data to a DRAM 99 for storage within a graphics controller board 100. In the decompressed form, data defining each pixel for the screen provides a one-to-one mapping and capability for instantaneous display. A graphics controller processor 102 on board 100 controls the transfer of the decompressed graphics data to liquid crystal display 23.

Figure 7:
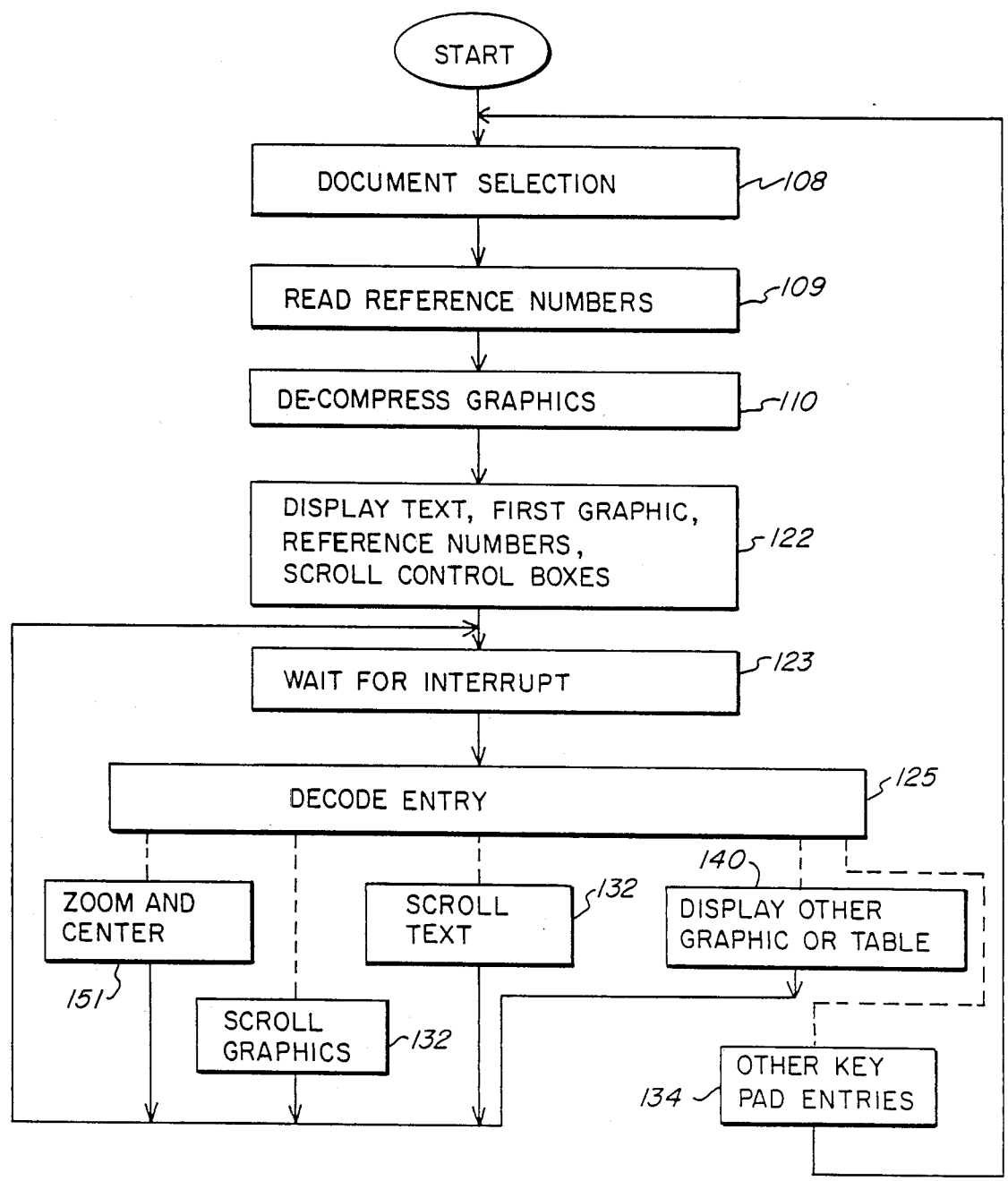
FIG. 7 is a flow chart illustrating the operation of a main microprocessor within the system of FIG. 1, which microprocessor has been programmed to implement the service manual application.

FIG. 7 is a flow chart illustrating the utilization of system 10 in an electronic service manual application. However, it should be understood that system 10 can be programmed to implement a wide variety of processes. Initially, a user may request via keypad 74 or keyboard 16, a menu of repair procedures contained within CD-ROM 24. After selecting from this menu by touch screen 70, other menus are displayed. After selecting from one of the latter menus, a document such as the one including the hyperpage illustrated in FIG. 3 with references for graphics 31–33 and data table 34 defining the selected repair procedure is identified (step 108).

Figure 6:
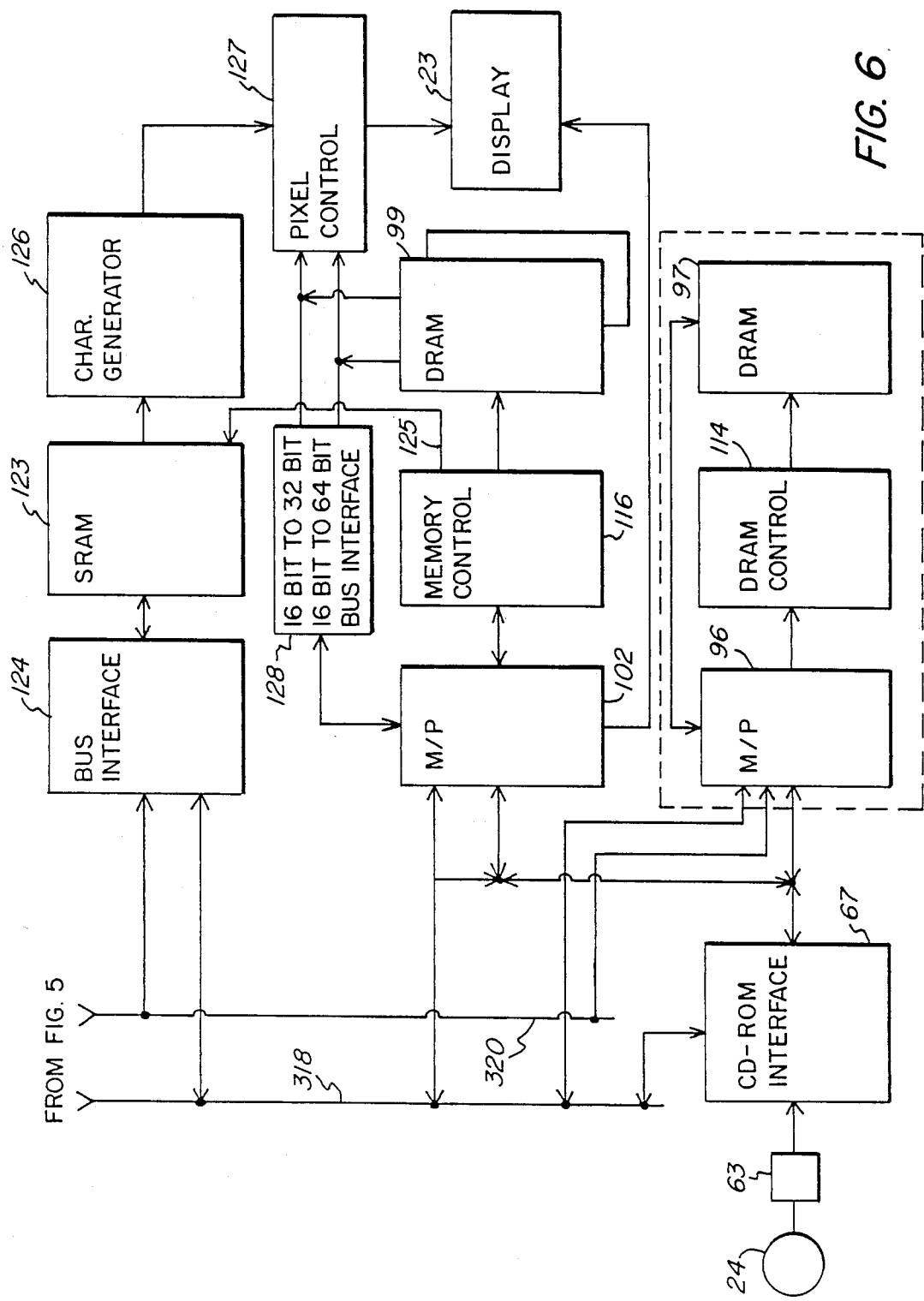
FIG. 6 is a schematic block diagram of other components of FIG. 4, and shows the interconnections between the components in more detail as well as related components.

Referring now to FIGS. 6 and 7, after the document selection, microprocessor 60 transmits a sector address to CD-ROM interface 67 via bus 320 to locate the selected document, and afterwards reads all the reference numbers within the document identifying all the graphic images within the selected document (step 109). Then CD-ROM reader 63 accesses the graphic information under the control of processor 60, which processor then extracts header information defining the size of the image and each region on LCD 23 which forms a touch pad as described in more detail below. The header information is stored in DRAM 72. Then, in step 110, decompression processor 96 reads the compressed graphic data of the selected document from CD-ROM 20 via interface 67 and decompresses the data with the aid of workspace DRAM 97 and DRAM controller 114. Then, processor 96 transmits the decompressed graphic image data to graphic control processor 102 for storage in DRAM 99 with the aid of memory control 116. Memory control presents the addresses specified by microprocessor 102 to DRAM 99 in two parts in two different cycles. One part specifies a column and the other part specifies a row. Data is read from DRAM 99 similarly in two cycles (DRAM control 114 operates similarly upon DRAM 97). By way of example, CCITT Group IV run length encoding was used to compress the data originally written into CD-ROM 24 and processor 96 implements corresponding run length decoding in the decompression process. Thus, all the graphic image data in decompressed form associated with the selected document is available from DRAM 99 for instantaneous display on LCD 23.

Next in step 122, microprocessor 60 causes a first portion of the document text 27, the first referenced graphic image, reference numbers 31–34, and text scrolling control symbols 118–121 to be displayed on LCD 23 as illustrated in FIG. 3. To do this, microprocessor 60 transmits the address of the text to CD-ROM reader 63 via bus 320 and interface 67. Then, a portion of the text is read into SRAM 123 via interface 67 and text bus interface 124. The processor 102 then determines the amount of text which will fit on LCD 23 at one time, and memory controller 116 addresses the text in SRAM 123 via lines 125. The addressed text is transformed into actual alpha numeric characters by a character generator 126. A pixel controller 127 combines the text character data with decompressed graphic data received from DRAM 99. In the illustrated embodiment of system 10, the alphanumeric information within each of the images such as label 129 is stored and retrieved as graphic information. However, the data table 34 in addition to text 27 is stored and retrieved as text.

Interface 128 selects sixteen pixels of data from either 16, 32 or 64 pixels of data stored in DRAM 99 in accordance with a zoom level of the image. The image presented in step 122 fills the LCD, and ordinarily DRAM 99 contains four times the detail and data necessary to fill the window at the zoom level indicated in step 122. Pixel controller 127 is designed to combine sixteen pixels of graphic data with the text from character generator 126, so that bus interface 128 under the control of processor 102 presents the sixteen pixels of graphic data simultaneously to control 127. In the most zoomed-out mode, interface 116 extracts sixteen pixels of data from DRAM 99 by ignoring the second and fourth pixel in both the X and Y directions and performing an "OR" function on the first and third pixels of every group of four pixels. The result is one pixel of data for every four pixels stored in DRAM 99 but the one pixel contains information from every other bit in the group so it will not miss a line.

Figure 8:
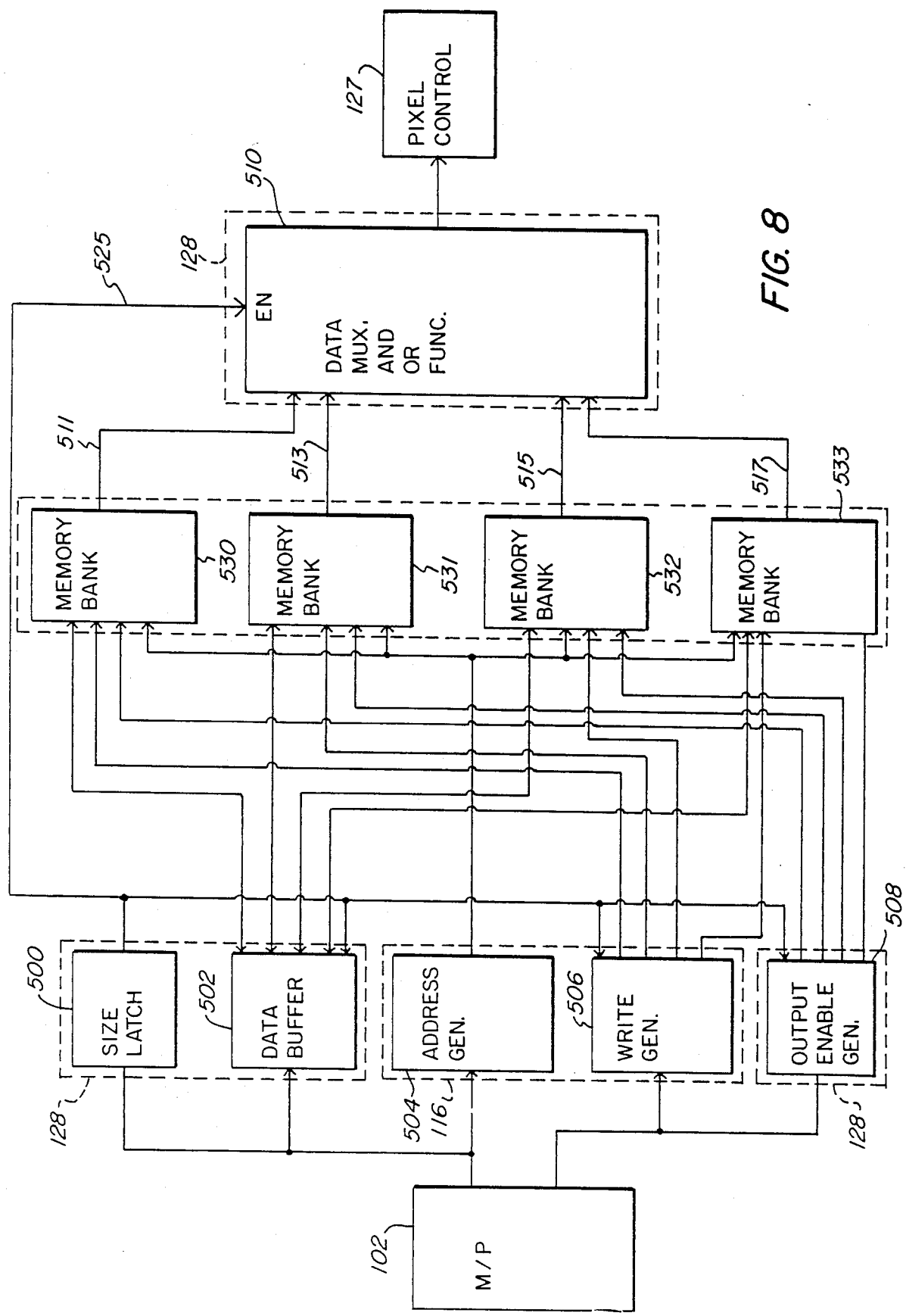
FIG. 8 is a flow chart illustrating in more detail a touch, centering and enlarging step described generally in FIG. 7.

To display the text, one graphic image, reference numbers and scroll control boxes, microprocessor 102 transmits image size data (1:4) to size latch 500 within interface 128 as illustrated in FIG. 8. Size latch 500 latches the size data for subsequent control of a data buffer 502, write generator 506 and output enable generator 508 within interface 128, and data multiplexor and OR function logic 510 within interface 128. Data buffer 502 controls the routing of data from microprocessor 102 to each of four memory banks 530-533 within DRAM 99 and vice versa. Next, microprocessor 102 transmits the addresses of the graphic image data to address generator 504 within memory control 116, a write command to write generator 506, and an output enable signal to generator 508. Generator 508 enables the corresponding memory bank within DRAM 99. Thus, the data is written into DRAM 99 via data buffer 502. In the 1:4 zoom-out mode of step 122, all of the memory banks output their data simultaneously to logic 510 which performs the OR function on the first and third pixels of each group of four and the elimination of the second and fourth pixels to yield a total of sixteen pixels of data which are transmitted simultaneously to pixel control 127. Data is supplied on sixteen lines 511 to logic 510 although, for simplicity, only one of the lines 511 are shown. In addition, each of the other memory banks 531-533 also supply sixteen pixels of data on sixteen lines 513, 515 and 517, respectively, although all lines are not shown. The first and third pixel of each group of four are supplied to an OR gate, and the outputs of the OR gates are supplied to a 1:4 buffer. Similarly, the outputs of the OR gates associated with the data input via lines 513, 515 and 517 are supplied to other OR gates which output to other buffers (not shown). In the step 122, the 1:4 buffers 524 are enabled so that in total sixteen pixels of data are supplied simultaneously to pixel control 127, and the 1:4 zoom-out mode is implemented.

The text portion 27 is displayed in a righthand portion of screen 23 and includes a title "Lower Ball Joint", subtitle "Removal" and a body describing a procedure for removing a lower ball joint. The remaining portion of the procedure is not displayed at this time because it cannot fit on the screen. The graphic image corresponding to reference 31 is displayed separate from the text to allow independent enlarging and scrolling of the graphic image and independent scrolling of the text.

In addition to displaying the text and graphics on LCD 23, microprocessor 60 also causes the display of text line-down, line-up, page-down and page-up control boxes or touch pads 118-121 respectively by addressing the corresponding data from DRAM 72, and writing the data into static random access memory (SRAM) 123 via bus interface 124. These control boxes control the scrolling of the text either line-by-line or page-by-page. To institute such control, the user simply touches the appropriate control box with the stylus 130.

Next, according to the flow chart of FIG. 7, microprocessor 60 waits for an interrupt indicating an entry either through keypad 74 or touch screen 70 (step 123). Upon receipt of the interrupt, microprocessor 60 reads interface 76 to determine the nature of the entry (step 125). If one of the text scrolling control boxes has been touched, microprocessor 60 jumps to a scrolling subroutine stored in DRAM 72 and scrolls the text by transmitting successive (or prior adjacent) addresses to reader 63 and thereby accessing the text in CD-ROM 24 at successive (or prior) locations (step 132). After such scrolling, microprocessor 60 returns to step 123 to await another interrupt.

When the next interrupt is received, microprocessor 60 reads interface 76 to determine the corresponding subroutine. If one of the graphic selection boxes has been touched by stylus 130 (step 140) corresponding to reference numbers 32 or 33, microprocessor 60 directs display processor 102 and memory controller 116 to display the selected graphic image on LCD 23 by memory controller 116 addressing the corresponding locations in DRAM 99. It should be noted that the display of a different graphic image is virtually instantaneous because the image data in DRAM 99 is stored in decompressed form, which decompression was implemented in step 110. Then, microprocessor 60 returns to step 123.

If the user now touches the selection box associated with data table 34, microprocessor 60 reads the address of the corresponding information in CD-ROM 24, and the information is read into SRAM 123 via interfaces 67 and 124 and displayed onto screen 23 via character generator 126 and control 127.

It should also be noted that image 31 includes other touch pads 147 and 148 which are associated with parts by arrows or lines 149 and 150, respectively. A touch of either of these pads in step 140 causes microprocessor 60 to display a graphic image or table corresponding to the associated part, which image is also stored in CD-ROM 24.

Next, microprocessor 60 returns again to step 123, and if the user touches screen 70 over a portion of graphic image 31 exclusive of the touch pads 147 and 148, the portion of the image is zoomed in or enlarged by a factor of two and centered at the touch point in window 61 (step 151). To zoom-in on the image by a factor of two, every other pixel is supplied to pixel control 127.

After returning again to step 123, microprocessor 60 can also respond to keypad entries (step 134).

Based on the foregoing, a teaching aid or demonstrator for a computer terminal has been disclosed. However, numerous modifications and substitutions may be made without deviating from the scope of the present invention. For example, if desired, the LCD and touch screen can be built into the overhead projector so there would be no separate module. Therefore, the invention has been disclosed by way of illustration and not limitation, and reference shall be made to the following claims to determine the scope of the invention.

What is claimed is:

1. A teaching apparatus comprising:
a frame adapted for support above an illumination window of an overhead projector;
a transmissive video display mounted in said frame above said illumination window of said overhead projector such that an image on said display is projected by said projector;
a touch screen mounted in said frame overlaying said display;
means for decoding touch points on said touch screen; and
means for driving said display to display text and/or images based on said touch points.

2. An apparatus as set forth in claim 1 wherein said display is a liquid crystal display.

3. An apparatus as set forth in claim 2 further comprising a stylus coupled to the decoding means for touching said touch screen and thereby designating touch points.

4. An apparatus as set forth in claim 3 further comprising means for deactivating said stylus such that points on said touch screen touched by said stylus do not activate the decoding means, whereby said stylus is usable as a pointer in conjunction with said overhead projector.

5. An apparatus as set forth in claim 4 further comprising a cable connected at one end to said stylus to couple said stylus to said decoding means, and a plug connected at the other end of said cable, and wherein the deactivating means comprises a socket coupled to said decoding means which socket releasably receives said plug.

6. An apparatus as set forth in claim 2 wherein said liquid crystal display and said touch screen are mounted parallel to said illumination window of said overhead projector, and said touch screen is transparent.

7. An apparatus as set forth in claim 2 further comprising means for automatically calibrating said touch screen during use of said touch screen to compensate for heating caused by said overhead projector.

8. An apparatus as set forth in claim 2 wherein said frame, display, and touch screen are combined as a discrete module.

9. A teaching apparatus comprising:
- an overhead projector having an illumination window and light means for projecting light through said window;
- a transmissive video display supported above said illumination window of said overhead projector such that an image on said display is projected by said projector;
- a touch screen overlaying said display;
- means for decoding touch points on said touch screen; and
- means for driving said display to display text and/or images based on said touch points.

10. An apparatus as set forth in claim 9 wherein said display is a liquid crystal display and said touch screen is transparent.

11. An apparatus as set forth in claim 10 further comprising:
- a stylus coupled to the decoding means for touching said touch screen and thereby designating touch points; and
- means for deactivating said stylus such that points on said touch screen touched by said stylus do not activate the decoding means, whereby said stylus is usable as a pointer in conjunction with said overhead projector.

12. An input/output video module comprising:
- a housing adapted for support above an illumination window of an overhead projector;
- a transmissive video display mounted in said housing above said illumination window of said overhead projector such that an image on said display is projected by said projector; and
- a touch screen mounted in said housing overlaying said display for designating points on said video display.

13. A module as set forth in claim 12 wherein said display is a liquid crystal display, and said housing supports said display parallel to said illumination window.

14. A module as set forth in claim 12 further comprising:
- a cable attached at one end to said housing; and
- a stylus attached to the other end of the cable for touching said touch screen and thereby designating said points on said video display.

15. An apparatus as set forth in claim 14 further comprising means for deactivating said stylus such that said stylus does not designate points on said video display, whereby said stylus is usable as a pointer in conjunction with said overhead projector.

* * * * *